Nov. 24, 1953  W. E. PRIESTLEY  2,660,013
PEANUT VINE PULLING MACHINE
Filed Dec. 4, 1948  5 Sheets-Sheet 1

INVENTOR.
W. E. Priestley
BY Forest B. Hitchcock
His ATTORNEY

Nov. 24, 1953 W. E. PRIESTLEY 2,660,013
PEANUT VINE PULLING MACHINE
Filed Dec. 4, 1948 5 Sheets-Sheet 3

INVENTOR.
W. E. Priestley
BY
His ATTORNEY

Nov. 24, 1953

W. E. PRIESTLEY 2,660,013

PEANUT VINE PULLING MACHINE

Filed Dec. 4, 1948

INVENTOR.
W. E. Priestley
BY
Forest B. Hitchcock
His ATTORNEY

INVENTOR.
W. E. Priestley

UNITED STATES PATENT OFFICE 2,660,013

PEANUT VINE PULLING MACHINE

William E. Priestley, Kendall, N. Y.

Application December 4, 1948, Serial No. 63,480

5 Claims. (Cl. 55—66)

This invention relates to harvesting machines, and more particularly pertains to a machine for harvesting peanuts.

Since the peanut plant has its blossoms above the surface of the ground on the ends of stalks which following the blossoming season reach down to the ground and develop peanut pods just below the surface of the ground, it is necessary to so handle the vines in removing them from the ground that the pods do not become detached from the vines and thus lost to the harvest. It is also desirable to leave the lower roots of the peanut plant in the ground because they serve to enrich the soil with nitrogen.

In view of the above consideration, it is proposed to provide as the embodiment of the present invention, a machine having a cutting instrument for severing the roots of the peanut plant from its vines below the surface of the ground and beneath the level where the peanut pods are located, together with a pulling device which will pull the vines directly upward after such severance so as to remove both vines and attached pods from the ground in a manner to take advantage of the fact that the blossom stalks will withstand the greatest pull in a vertical direction.

It is a further object of the present invention to provide a machine that can operate along the rows of peanut plants at a relatively high rate of speed and yet maintain the same action on the peanut vines as when operating at a relatively slow rate of speed.

Generally speaking, and without making any attempt to define the exact nature of the invention, it is proposed to provide as one form of the invention, a power driven carrier adapted to move along a row of peanuts and having attached thereto a horizontal knife adapted to travel beneath the surface of the ground at a predetermined depth for severing the lower portions of the roots of the peanut plants from the vines or stalks extending above the ground. Associated with this knife and located above the surface of the ground are two wheels mounted on parallel shafts at a predetermined angle away from the vertical, and so located that the two wheels contact each other directly over the row of peanut plants. The mounting for these wheels is so located that their lower peripheries are just above the surface of the ground. The power driven carrier thus can move the knife and these wheels along a row of the peanut vines permitting the peanut vines to enter between the two contacting wheels just subsequent to their severance from their roots. Power is also supplied to the wheels to cause their rotation to pull the vines along the line of contact between the two wheels. In the present embodiment, the wheels are shown as having pneumatic tires slightly underinflated so as to produce a substantial area of contact with the line of movement of any contacting point being of substantial length.

The engagement of the vines between the two contacting wheels will obviously produce a vertical pull on the vines having direction dependent upon the ratio between the speed of rotation of the wheels and the travel of the machine along the row of peanut vines. For the purpose of effecting an exactly vertical pull upon the peanut vines, it is necessary to provide such a rate of rotation of the wheels that the horizontal travel component of the contacting line will correspond in amount but be opposite in direction to the horizontal travel of the machine. In this case, the only component acting upon the vines is the vertical component of travel of the contacting line between the two wheels, which may be termed the pulling component. The actual distance of pull will depend upon the length of the line of contact movement and its angle with respect to the ground. Although a directly vertical pull on the vines may be desirable in some cases, it should be understood that other angles of pull may be provided by properly selecting the relative rate of rotation of the contacting wheels.

The power driven carrier also is preferably provided with a power driven elevator adapted to receive the vines as they are pulled by the pneumatically tired pulling device and raise them to a collecting tray which may be periodically dumped. In this way, the peanut vines together with the stalks bearing the peanut pods are pulled, collected and dumped in bunches as the machine travels along the row of peanuts.

In another form of the invention, the same knife arrangement is provided to travel beneath the surface of the ground, but the pulling device associated therewith is of a different form which comprises a rotary drum having a plurality of spaced arms each having a suitable length and diameter to extend into the ground and reach under the trunks of peanut plants and then raise them. This form of the invention also contemplates the use of an elevator for carrying the plants to a suitable collector.

Other objects, purposes and characteristic features of the present invention will be in part obvious from the accompanying drawings and in part pointed out, as the description of the invention progresses.

In describing the invention in detail, reference will be made to the accompanying drawings, in which like reference characters designate corresponding parts throughout the several views, and in which—

Figure 1:
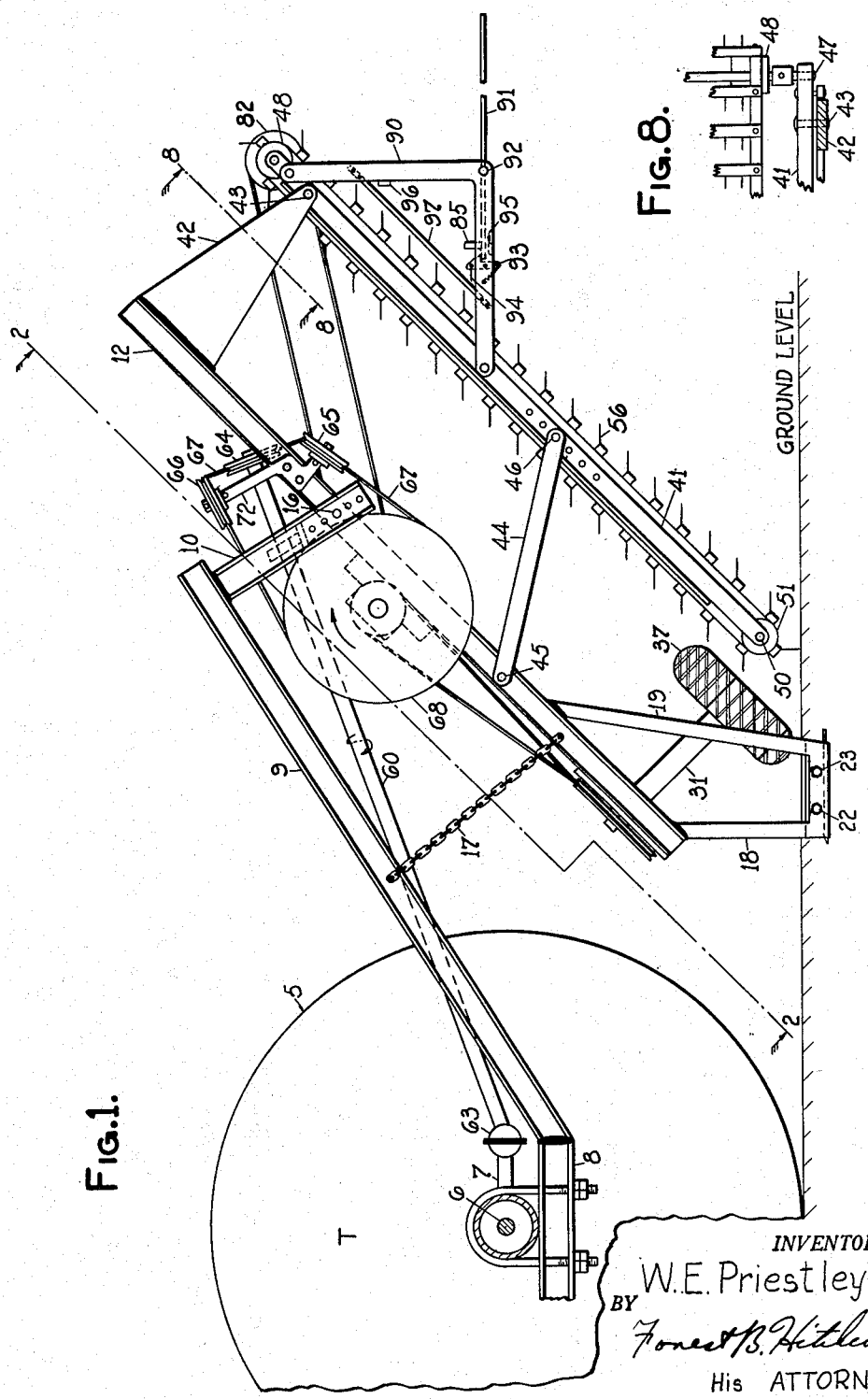
Fig. 1 is a side elevation of one form of the present invention including the pulling device having two contacting wheels with pneumatic tires.
Figure 2:
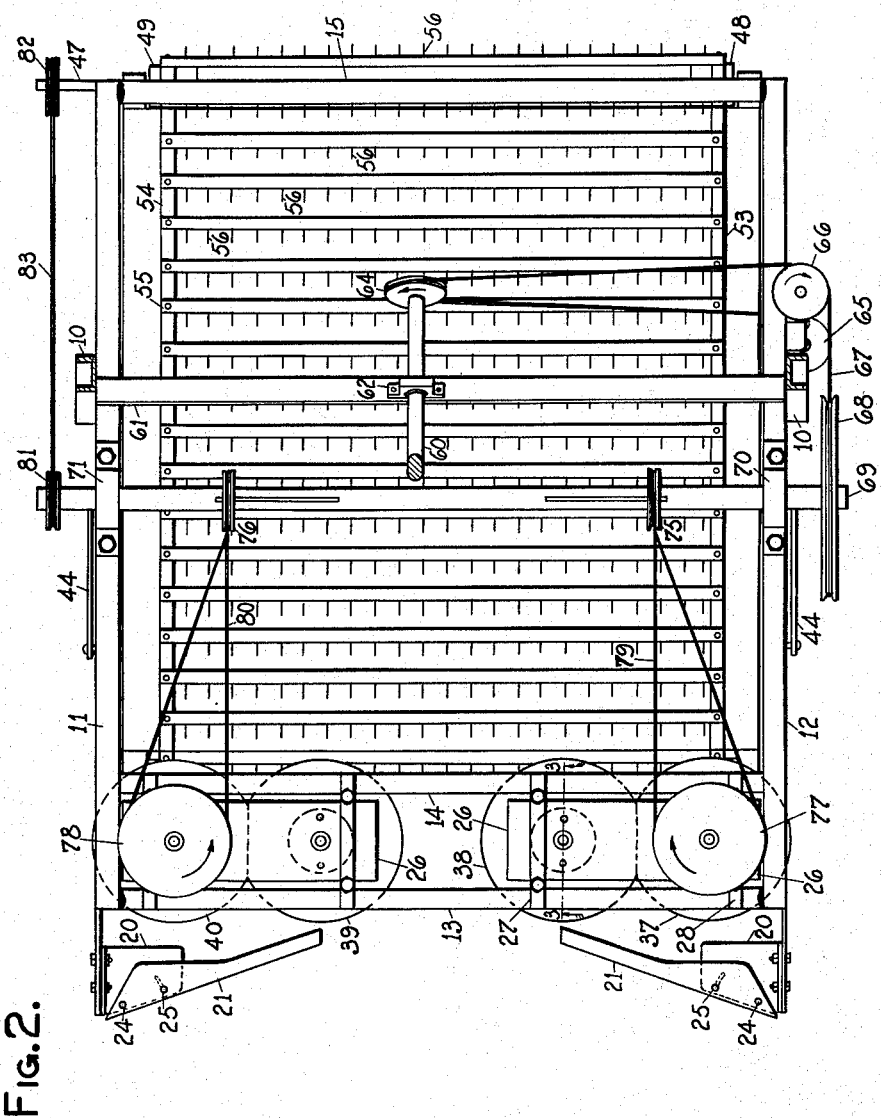
Fig. 2 is a top view of the machine shown in Fig. 1 but taken on line 2—2 of Fig. 1.
Figure 6:
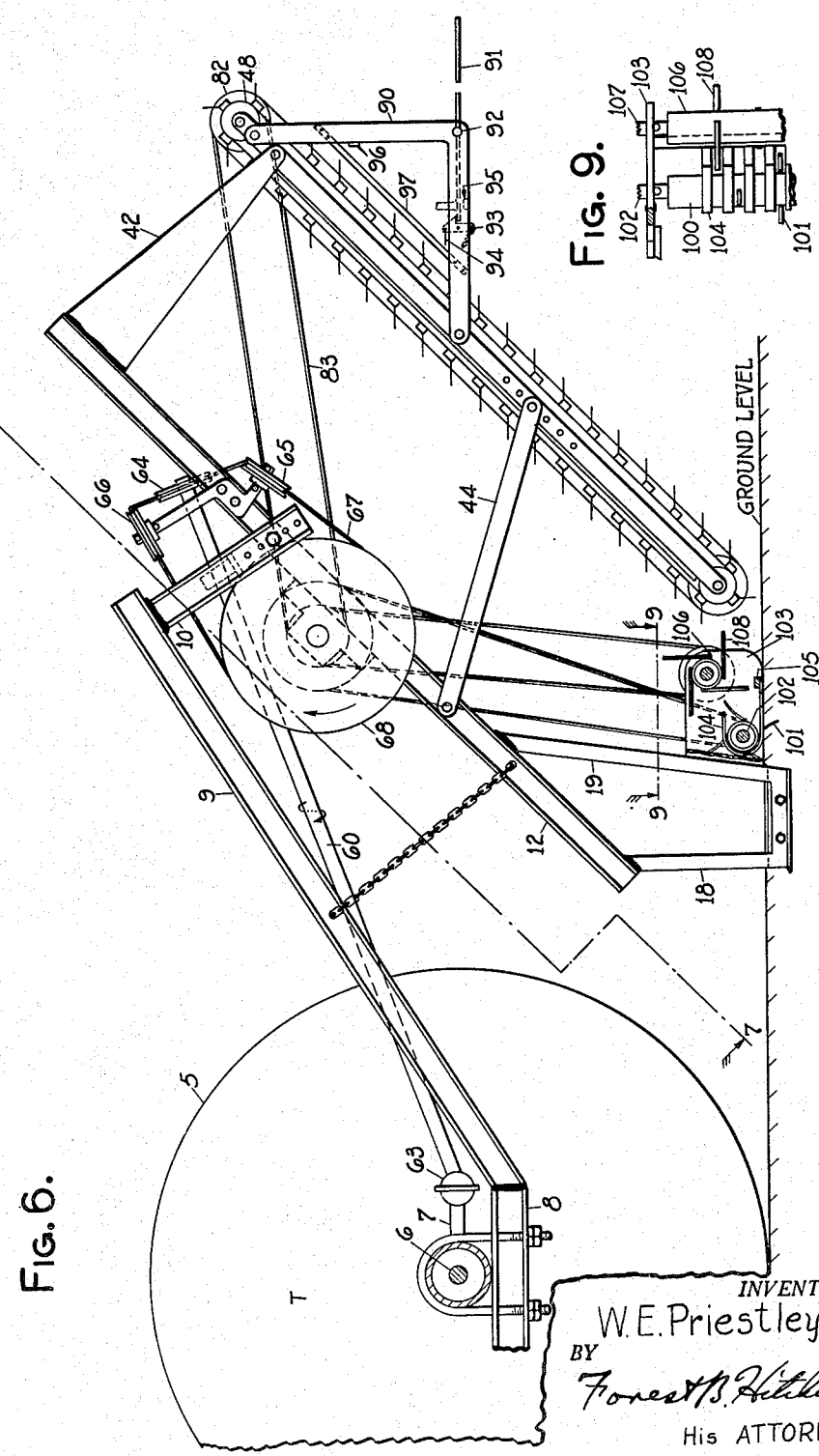
Fig. 6 is a side elevation of a second form of the present invention including a rotary drum type pulling device.
Figure 7:
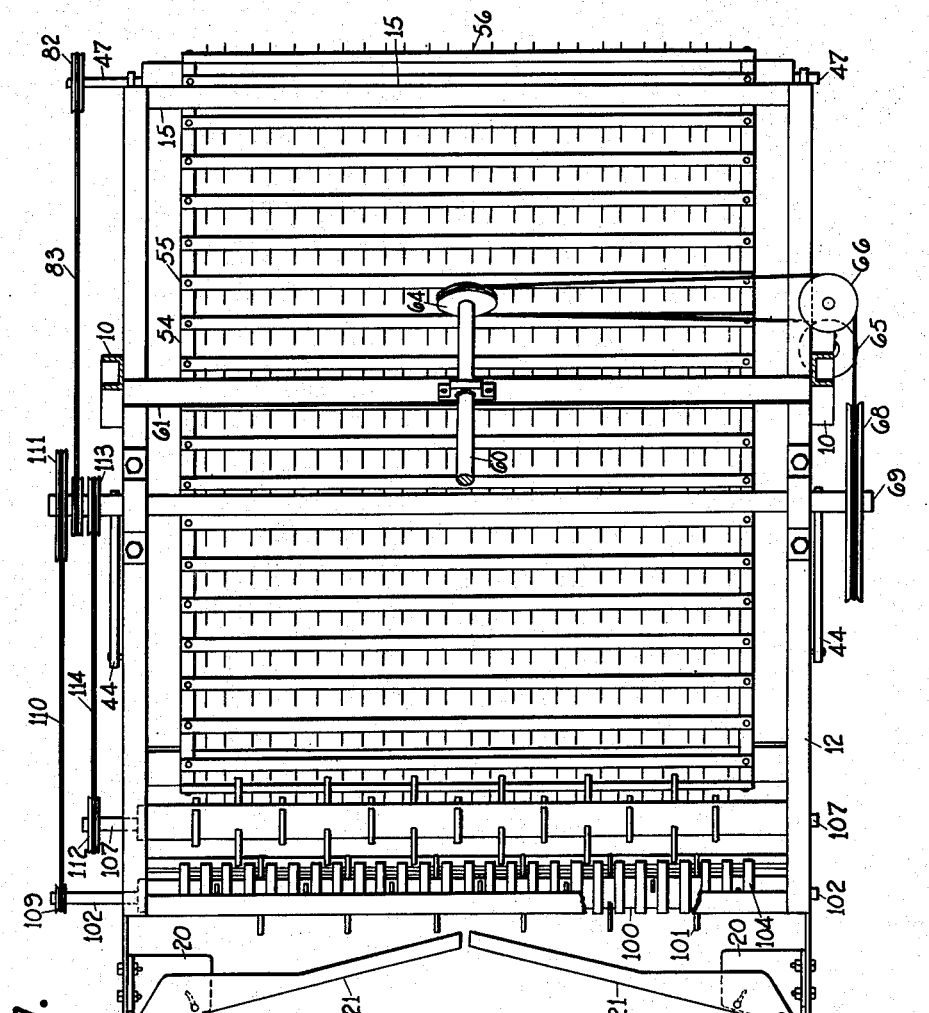
Fig. 7 is a top view of the machine shown in Fig. 6 taken on line 7—7 of Fig. 6.

Fig. 8 is a partial sectional view taken on line 8—8 of Fig. 1 of the pulley support for the slatted belt type elevator shown in Figs. 2 and 7; and Fig. 9 is a partial view taken on line 9—9 of Fig. 6 of the rotating drum type pulling device shown in Fig. 7.

For the purpose of simplifying the illustration, and facilitating in the explanation, the various parts constituting the embodiments of the invention have been shown in their more simple form, and in some cases conventional illustrations have been employed rather than showing all of the details of a structure which would actually be employed in practice, the drawings having been made more with the purpose in mind of making it easy to understand the purposes and mode of operation of the invention, than with the idea of illustrating the specific structure and design of parts that would be employed in practice.

Referring to Fig. 1 of the drawings, a portion of a tractor T is shown as having a power driven wheel 5 attached to its rear axle 6 from which a power take-off 7 is provided.

It is of course understood that the tractor T is to be considered as being of the conventional type having the usual power plant, steering mechanism and the like, so that it can be driven along the rows of peanuts or other vines as desired. A tractor thus constructed is suitable to either carry the harvesting machine of the present invention or draw it along as desired. In both cases, the tractor also furnishes power for driving the harvesting machine's devices as disclosed herein. However, a separate power plant could be provided for driving the machine's devices, if desired.

The harvesting machine of the present invention includes a carrying frame formed by having two horizontal arms 8 which are suitably attached beneath the rear axle 6 of the tractor T by suitable U-bolts, and also to the frame of the tractor T, so that the two obliquely extending arms 9 are rigidly held upright in position. These two arms 9, one on each side of the tractor T and extending rearwardly, are connected by a cross bar between them and near their outer ends. This cross bar has not been shown in Fig. 2 since it would obscure certain other parts. Extending downwardly from the arms 9 adjacent the cross bar are two supports 10, portions of which are shown in Fig. 2, and which thus form a U-shaped carrier for pivotally supporting the operating mechanism, as presently described.

This operating mechanism is provided with two longitudinal frame members 11 and 12 as seen in Fig. 2 formed of channel beams. These frame members 11 and 12 are cross connected by angle beams 13, 14 and 15 to give rigidity to the frame structure and also to provide supporting means for other parts.

The frame provided by the supports 11 and 12 is pivoted on both sides at points 16, and the end of the frame extending towards the tractor T, because of its weight, assumes a lowered position determined by two limit chains 17.

Figure 5:
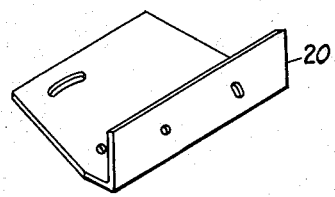
Fig. 5 is an enlarged perspective view of a foot used for holding a horizontal knife.

Extending downwardly from each support member 11 and 12 is a braced leg formed by metal strips 18 and 19, as viewed in Fig. 1. These metal strips 18 and 19 are connected by a cross member at their base, and have attached thereto a foot member 20 as viewed in Figs. 2 and 5. In brief, there are two downwardly extending legs, one on each side of the machine, and each having a foot member 20 attached thereto. Each of these members 20 has attached thereto a suitable knife 21. Each foot member 20 has a circular hole in its forward position (see Fig. 5) so as to be pivoted at point 22 (see Fig. 2), but an oblong hole is provided in its rearward position to permit such pivoting movement and yet provide that it may be held in its adjusted position by a bolt at 23 passing through this oblong hole. Also, each knife 21 is provided with a pivot point at 24 which allows the knife 21 to have its angle adjusted because of the oblong hole in the foot member 20 which provides for a bolt 25 to maintain its set position. Although this description has been given more particularly for the left hand foot and knife shown in Fig. 2, it is to be understood that the same structure is employed for the right hand foot. In this connection, it might be well to state that the machine embodying the invention is constructed so as to be able to harvest two rows of peanuts at the same time. For this reason dual knives and peanut pulling devices are provided.

Figure 3:
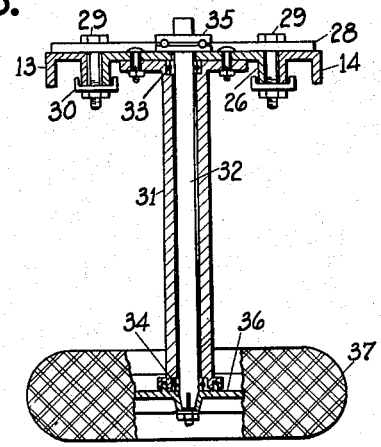
Fig. 3 is an enlarged sectional view of one of the contacting wheels and its supporting axle shown in Figs. 1 and 2.

Between the cross beams 13 and 14 are located the two moveable supports for the vine pulling devices. Each such support comprises a wide channel beam type member 26 which is held in position by two cross bars 27 and 28, each of which has bolts 29 extending between the beam 26 and the respective cross bars 13 and 14 to engage U-shaped members 30 as seen in Fig. 3. In this way, the beam 26 may be adjusted to a suitable position on the cross bars 13 and 14 in accordance with the distance between two rows of peanuts being harvested simultaneously by the machine.

Figure 4:
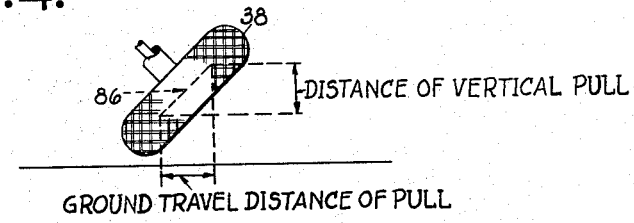
Fig. 4 is a diagrammatic illustration of the operation of the contacting area between the wheels shown in Figs. 1 and 2.

Each mounting member 26 has attached thereto a tubular casing 31 (see Fig. 3) in which is mounted a shaft 32 having bearings 33 and 34 at opposite ends. A thrust bearing 35 is also provided at its upper end. At the lower end the shaft 32 has mounted thereon a wheel 36 in a suitable manner to provide protection for the bearing 34 from dust and dirt. This wheel 36 is provided with a pneumatic tire 37 which is of the thin walled type and is underinflated so that the contact between it and its mate 38 as viewed in Fig. 2 provides a substantially straight line of contact for a substantial distance. In this connection, it should be understood that both of the tires 37 and 38 should be inflated to the same pressure to provide this uniform line of contact. Also it should be understood that the contact between these two tires may be considered as a line as shown in the diagram of Fig. 4 for the purpose of resolving the directions of pull and travel, but actually the contact between the two tires is of substantial width, thus forming a substantial contacting area.

In brief, the two wheels (or pneumatic tires) 37 and 38 are mounted on the member 26 at properly spaced points to provide for the proper contact between the wheels. The oblique angle formed between the ground and the plane in which the wheels rotate is selected in accordance with the distance of vertical pull desired. This angle can be selected within the necessary limits by selecting the location of the pivot point 16 for the side beams 11 and 12 on the arms 10. Obviously, the oblique angle is increased and the vertical pull is likewise increased when the pivot point is moved upwardly on the side arms 10; whereas the oblique angle is decreased and the length of vertical pull is likewise decreased when the pivot point 16 is moved downwardly on the side arms 10. In this connection, a change in the angle may also require a change in the length of the chain 17 so that the wheels 37, 38, 39 and 40 will be properly positioned just above the surface of the ground. Also, a change in the oblique angle will require the adjustment of the tilt of the knives 21 on their pivot points 22. This can obviously be obtained by loosening the bolt 23 and adjusting the knives 21 accordingly. In this connection, it is desirable to have the knives just slightly pointed downwardly so that the ground will be slightly disturbed making it easier to pull the vines and their connected peanuts.

Referring to Fig. 1, it can be seen that a suitably slatted elevator is provided extending across the carrier as shown in Fig. 2. This elevator is formed by side bars 41 being pivoted from arms 42 at points 43 on each side. These side arms 41 can be raised or lowered depending upon the positions of the braces 44 on either side which are pivoted on the side bars 11 and 12 at points 45 and adjustably positioned on the bars 41 at points 46.

Referring to Figs. 2 and 8, it will be seen that the upper end of the elevator has a shaft 47 extending between the side bars 41 and having pulleys 48 and 49 located thereon and suitably keyed thereto. The lower end of the elevator also includes a shaft 50 which passes between the side arms 41 and has pulleys 51 and 52 mounted thereon. These pulleys 51 and 52 are free-running. Two belts 53 and 54 are mounted over the respective pairs of pulleys at the upper and lower ends on each side. Rectangular slats 55 extend between belts 53 and 54 and are located at equally spaced intervals throughout their length. These slats have protruding teeth 56 as seen in Figs. 1 and 2 which are so passed through the diagonal of the rectangular slats that they point downwardly away from the direction of the movement of the slats on the upper side of the elevator, as viewed in Fig. 1.

As previously mentioned, the rear axle of the tractor T is provided with a conventional power take-off 7. A shaft 60 is mounted at one end on a cross member 61 by a suitable self-aligning bearing 62 and has its other end connected to the power take-off 7 through a universal joint 63 of any suitable type. On the outer end of the shaft 60 is located a pulley 64 which is directly opposite to idler pulleys 65 and 66 which are mounted on upright axis at slightly divergent angles as best viewed in Fig. 1 so as to provide for the suitable passage of belt 67 around pulley 68 which is mounted on the horizontal shaft 69. This shaft 69 is supported by the side beams 11 and 12 by suitable bearing members 70 and 71.

In this connection, it will be seen that the pulley 68 may move on an arc about the pivot point 16 within certain limits due to the unevenness of the ground and the particular adjustment of the limit chains 17 without affecting the belt and pulley adjustment. Even though slight movement occurs, the idlers 65 and 66 remain in corresponding positions with respect to the pulley 68, since they are mounted on bracket 72 attached to beam 12. The belt 67 in passing over the idlers 65 and 66 changes its direction at substantially right angles exactly opposite the pulley 64 so that such arcuate movement of the idlers 65 and 66 about the point 16 is substantially tangent to a circle having the shaft 60 as its center and in the same plane with the pulley 64. For this reason, any oscillatory movement of the side beams 11 and 12 does not interfere with the proper transmission of power from the pulley 64 to the pulley 68.

The shaft 69 has keyed thereto pulleys 75 and 76. Also, pulleys 77 and 78 are mounted on extending portions of the shafts to which the wheels 37 and 40 are attached. These pulleys 77 and 78 are so located opposite the pulleys 75 and 76 respectively, that the belts 79 and 80 can be connected between their respective pairs of pulleys in a manner to permit pulleys 75 and 76 on the shaft 69 to act as the drivers. Referring to Fig. 1, it will be seen that the lower edge of pulley 75, for example, is on a line tangent to the circumference of the pulley 77, whereas the upper side of the pulley 75 is above the line tangent with the pulley 77, but this does not matter since it is the return portion of the belt 79 which is here involved.

The power take-off from the tractor supplies a rotational torque on the shaft 60 in the direction of the circular arrow shown in Fig. 1 similarly indicated on the pulley 64 in Fig. 2. This causes the pulley 68 to be driven in a clockwise direction as viewed in Fig. 1. Power is in turn tranmsitted through belt 79 to rotate pulley 77 and its associated wheel 37 in a clockwise direction. This rotation of wheel 37 through the contact area with wheel 38 causes it to rotate in a counterclockwise direction. Similarly, the pulley 78 transmits power through the belt 80 to rotate the pulley 78 and its associated wheel 40 in a counterclockwise direction which in turn transmits rotational energy to the wheel 39 through the contacting area between such wheels so as to rotate it in a clockwise direction.

Referring to Fig. 2, it will be seen that a pulley 81 is attached to the extreme end of the shaft 69 in line with a pulley 82 connected to the shaft 47 so as to provide for the transmission of power between the two shafts over the belt 83. This causes the pulleys 48 and 49 to be driven in a clockwise direction as viewed in Fig. 1. These pulleys 48 and 49 in turn cause the belts 53 and 54 to travel in a way to effect the movement of the slats 55 in an upward direction along the upper surface of the elevator.

On each side of the elevator are elbows 90 which provide for the support of a collector 91 pivoted at points 92. This collector 91 is so constructed that it has a greater length to the right of pivot point 92 than there is to the left of such point so that vines which are elevated and fall onto the collector produce a tendency to clockwise rotation about point 92. Such clockwise rotation is prevented by the spring biased latch 93. This spring biased latch 93 may be released by a pull on a cable 94 to allow the collector 91 to rotate in a clockwise direction and dump the collected vines. However, as soon as the vines leave the collector, immediately it returns to its initial position due to gravity. This is because the left side of the collector is heavier than the right side as viewed in Fig. 1 (although it is shorter) on account of the back board 85 running along the rear of the collector. The normal position is determined by a limit stop 95 on each horizontal arm of the elbow member 90; whereas the operated movement is limited by stops 96 on the upright arms of the elbow members 90. The vines that are gathered on the collector 91 are prevented from being engaged by the retreating teeth on the elevator by reason of a flat sheet like shield 97 which extends across the under surface of the elevator between the elbow members 90 on opposite sides of the elevator.

Operation

It is contemplated that the present invention will be adaptable for use in various connections where vines are to be pulled vertically from the ground, but for the sake of definiteness the present embodiment has been more particularly adapted to harvesting peanut vines. The form of the invention shown in Figs. 1, 2, 3, 4 and 5 is particularly adaptable for pulling the vines of peanut plants which grow in rows. Obviously, the harvesting machine might include any number of pulling devices, as contemplated in accordance with the present invention, but for the purposes of the present embodiment only two such pulling devices have been shown. Thus, when the vines are to be harvested by the machine of the present invention, the wheels 37, 38, 39 and 40 are adjusted to proper positions by reason of the adjustable members 26 being so moved along the beams 13 and 14 that the point of contact between the wheels 37 and 38 is in line with one row while the point of contact between wheels 39 and 40 is in line with an adjacent row. The tractor T is of course self-propelled and moves the machine along the two rows and at the same time transmits power to the wheels 37, 38, 39 and 40 so that they rotate engaging the vines from the two rows at their respective areas of contact.

For some types of peanuts, it is desirable that they be pulled substantially in a vertical direction and in accordance with the present invention this is accomplished by so selecting the ratio between the pulleys between the power take-off 7 and the pulleys 77 and 78 that the horizontal component of the travel speed between points of contact on the wheels 37 and 38 for example is exactly equal and opposite to the direction and speed of travel of the machine over the ground. With reference to Fig. 4, it can be seen that the contacting travel caused by the rotation of the wheels can be divided into two components, the horizontal and the vertical. For example, any point on wheel 38 which initially contacts with wheel 37 travels along a line 86 for a distance represented by its length. The actual length of this line can be divided into the "distance of vertical pull" and the "ground travel distance of pull." The speed at which a point on wheel 38 travels along the line of contact 86 may thus also be divided into the ground travel speed of the pull and the vertical travel speed of the pull. The vertical distance of pull may also be termed the lift distance. This distance is dependent upon the oblique angle at which the wheels are set. Thus, with the speed of rotation properly selected, as above explained, the pull on the vines is exactly vertical because the point of contact of a vine between the wheels travels along the ground travel distance toward the rear of the machine at the same speed that the machine is traveling forward over the ground. Thus, the vine contacting point has no resulting travel with respect to the ground, and the force exerted on the vine is a vertical pull through the vertical lift distance.

As the machine travels along the rows of vines, the knives 21 separate the vines from their roots beneath the surface of the ground. This allows the vines together with the connected peanuts free to be pulled and carried upward to a point over the elevator. As the vines leave the points of contact of the pulling device, they are received by the conveyer and carried upwardly to the top of the elevator and allowed to fall into the collector 91.

When the collector 91 has been filled to the desired extent, the latch 93 can be released to allow the collector to drop the vines. This control of the latch may be manual or may be automatic; and in either case, it can be so controlled so as to provide for bunches of vines in equally spaced intervals across the field. The automatic control of the latch could of course be controlled by a suitable gear reduction from the power take-off so that a given distance would be traversed by the machine for each release of the collector.

With some kinds of peanuts, it is desirable that they be distributed along the row rather than being collected in bunches. In such cases, the elevator and collector may be removed from the machine. The vines are pulled by the pulling device and allowed to fall directly along the row in the rear of the machine. In cases of this kind, it is desirable to provide a certain amount of rearward thrust on the vines to keep them from collecting about the pulling device and also to cause them to lie in generally uniform direction along the row as the machine passes along. This is effected by the machine of the present invention by providing that the pulling wheels be driven at a faster rate than above explained, so that the horizontal travel speed of the contacting points between the wheels shall be greater than the travel speed of the machine in the opposite direction along the ground. The difference between these two rates or speeds is the net thrust rearwardly on the vines.

Structure of Figs. 6 and 7

The present invention is also embodied in a form illustrated in Figs. 6 and 7 which is more particularly useful in connection with those types of peanuts which spread or do not grow in well defined rows. This form of the invention is similar in many respects to the preferred form above described, but differs in the type of pulling device employed. Also, the underground cutting knives rather than being relatively short as shown in Fig. 2 are sufficiently long to meet at the center of the machine as seen in Fig. 7.

This form of the invention includes the same tractor T and the same general form of carrier and drive mechanism. Also, the same type of elevator and collector is employed. This is indicated in the drawings by the use of the same reference characters.

The pulling device is formed by a relatively long drum 100 to which projecting arms 101 are attached at spaced intervals along its length and with backwardly sloping attachment as shown in Fig. 6. This drum 100 is attached to a shaft 102 which passes through it and is provided with suitable bearings at opposite ends by reason of the supporting plates 103 attached to the downwardly extending supports 19 also employed in Fig. 1. Surrounding the drum 100 are a large number of spaced shoes 104 all of which are connected on their lower ends to a laterally extending bar 105 which is attached at its opposite ends to the supports 103 on opposite sides of the machine. The arms 101, thus, in effect rotate in slots formed by these shoes which tend to prevent the vines and their attached peanut stalks from being wound about the drum 100 as it rotates. The arms 101 reach under the peanut stalks and lift or pull them from the ground. Referring to Fig. 6, it can be seen that these shoes 104 in effect slide along the surface of the ground, and the arms 101 on the drum 100 reach into the ground and lift upwardly as they travel in a clockwise direction about the shaft 102.

Just to the rear of the pulling arms 101 on drum 100 is a beater. This comprises another drum 106, which passes over a shaft 107 being suitably mounted thereon. This shaft 107 is also provided with suitable bearings in the support members 103 on opposite sides of the machine. Mounted on the beater drum 106 are beater arms 108 which are straight and are suitably welded to the drum in positions tangent thereto. This drum 106 is so positioned to the rear of the drum 100 that the beater arms 108 pass upwardly through the slots formed by the shoes 104. However, these slots alternate with the slots employed by the arms 101. In other words, both of these drums 100 and 106 rotate in a clockwise direction as viewed in Fig. 6, the pulling or lifting drum 100 rotating approximately four times as fast as the beater drum 106. The arms 108 thus serve to pick up the vines from the upper portions of the shoes 104 as they are brought to that position by the arms 101. The vines are then pushed over the top of the beater onto the elevator which carries them to the collector 91 in a manner previously described.

Referring to Fig. 7, it will be seen that a relatively small pulley 109 is attached to the shaft 102 and has a belt 110 connecting it with a relatively large pulley 111 on the shaft 68. Obviously, the belt 110 is driven by pulley 111 in such a direction as to cause the clockwise rotation of the pulling drum 100. Similarly, the pulley 112 is attached to the shaft 107 and is connected to the pulley 113 through the medium of the belt 114 which also provides for the clockwise rotation of the drum 106 as viewed in Fig. 6. As above mentioned, suitable ratios are selected for the pulleys 109 and 111, also the pulleys 112 and 113, to provide that the beater drum 106 will operate more slowly than the pulling drum.

The operation of the machine will of course be apparent by analogy of the description previously given in the preferred form of the invention shown in Figs. 1 and 2. As the tractor T moves the machine along the ground, the knives cut the peanut stalks from the lower portions of their roots, and the pulling arms 101 are rotated sufficiently rapid to lift the vines with their connected peanuts from the ground and pass them over the beater to the elevator. The beater not only acts as a passing medium and as a means of keeping the pulling drum and its associated shoes cleared of vines, but also acts to sufficiently vibrate the vines as to remove excess dirt from them which can obviously fall to the ground at the rear of the drum.

Having thus described two forms of a peanut harvesting machine as embodying the principles of the present invention, it is to be understood that various other modifications, alterations and adjustments may be made to meet the various conditions and requirements of practice without in any way departing from the contemplated scope of the invention.

What I claim as my invention is:

1. In a peanut harvesting machine, a power driven carrier for moving along a row of peanut vines, two wheels attached to said carrier and both having rubber tires, said wheels being located on parallel axes at a predetermined angle away from the vertical and at predetermined distances apart to cause said tires to make a travelling contact, said wheels being located just above the surface of the ground and adapted to move along a row of vines in a manner that the vines may enter between said wheels at the initial travel point of their contact and may leave said wheels at the last of their travelling contact, power operated means for driving said wheels in a direction to make their points of contact travel in a direction opposite to the direction of travel of said power driven carrier and at a corresponding speed.

2. In a harvesting machine, a power driven carrier for moving along a row of vines, a pulling device attached to said carrier comprising a pair of wheels having mounted thereon low pressure pneumatic tires, said wheels being so spaced as to cause said tires to contact each other causing a limited depression of each tire to thereby produce a substantial mutually contacting area on the tires, the axes of said wheels being parallel and said wheels assuming an inclined plane relative to the horizontal and said wheels being located just above the surface of the ground, power operated means for driving said two wheels in a direction to cause the points of contact between said tires to travel in a direction opposite to the direction of movement of said power driven carrier.

3. In a harvesting machine, a pulling device comprising a pair of wheels having resilient tires mounted thereon, said wheels being located at points having a distance between them less than the sum of their radii to thereby cause said tires to be depressed at their points of contact, said wheels being adapted to being moved along the surface of the ground but forming an oblique angle thereto, power operated means for driving said wheels to cause their points of contact to travel in a straight line in a particular direction, and means for moving said pulling device along a row of vines in the opposite direction and over said row to thereby cause the vines to enter the contacting area between said tires, whereby said vines are pulled substantially vertically from the ground upon entering the contacting area between said tires.

4. In a peanut harvesting machine, a carrier capable of being power driven forwardly over the ground at a selected speed, two circular wheels mounted on said carrier and each being provided with slightly deflated pneumatic rubber tires, said wheels having their axes extending parallel to each other in a plane slightly off the perpendicular and tilted toward the forward portion of said carrier, said axes being spaced at a distance such as to cause said pneumatic tires to be compressed to thereby provide travelling points of contact exerting substantially the same force against each tire throughout its contacting travel, and power driven means for rotating said wheels at a rate to cause said travelling points of contact to move horizontally at a speed corresponding to said selected forward speed of said carrier, said points of contact also moving obliquely away from the ground, whereby peanut vines will be gripped with substantially the same force throughout the vertical pulling operation performed by said pneumatic tires.

5. In a harvesting machine, a power driven tractor having a vine pulling device attached thereto comprising a carrier frame, a pair of wheels having resilient tires, said wheels being mounted on parallel axes on said carrier frame at points spaced apart a distance less than the sum of their radii to thereby cause said tires to be depressed at their points of contact, said wheels being mounted to cause said tires to form an oblique angle with respect to the ground, a power drive connection between said wheels and said tractor for driving said wheels to cause their points of contact to travel obliquely away from the ground in a direction opposite from the direction of movement of said tractor and the attached pulling device, said points of travel having a horizontal component moving at a speed substantially corresponding to the forward speed of said tractor and the attached pulling device and having a vertical component for pulling any vines entering the contacting area between said tires.

WILLIAM E. PRIESTLEY.

References Cited in the file of this patent

UNITED STATES PATENTS

| Number | Name | Date |
|---|---|---|
| 1,182,149 | Douglass | May 9, 1916 |
| 1,345,189 | Howser | June 29, 1920 |
| 1,568,594 | Flint | Jan. 5, 1926 |
| 1,719,871 | Burts | July 9, 1929 |
| 1,928,868 | Poen | Oct. 3, 1933 |
| 1,938,347 | Munger | Dec. 5, 1933 |
| 2,155,543 | Grignolo | Apr. 25, 1939 |
| 2,247,293 | Flintjer | June 24, 1941 |
| 2,297,294 | Flintjer | Sept. 29, 1942 |
| 2,368,895 | Spiegl | Feb. 6, 1945 |
| 2,436,831 | Silva | Mar. 2, 1948 |
| 2,455,906 | Ronning et al. | Dec. 7, 1948 |